(12) United States Patent
Nufer et al.

(10) Patent No.: US 7,323,645 B2
(45) Date of Patent: Jan. 29, 2008

(54) BALANCE WITH AN ELECTROSTATIC CHARGE BUILD-UP SENSOR

(75) Inventors: Bruno Nufer, Illnau (CH); Arthur Reichmuth, Wetzikon (CH)

(73) Assignee: Mettler-Toledo AG, Greifensee (CH)

( * ) Notice: Subject to any disclaimer, the term of this patent is extended or adjusted under 35 U.S.C. 154(b) by 0 days.

(21) Appl. No.: 11/627,800

(22) Filed: Jan. 26, 2007

(65) Prior Publication Data

US 2007/0175675 A1 Aug. 2, 2007

(30) Foreign Application Priority Data

Jan. 27, 2006 (EP) .................................. 06100970

(51) Int. Cl.
*G01G 21/28* (2006.01)
(52) U.S. Cl. .................................................... 177/180
(58) Field of Classification Search ......... 177/180–181
See application file for complete search history.

(56) References Cited

U.S. PATENT DOCUMENTS

| 5,107,945 | A |   | 4/1992 | DeWees |  |
|---|---|---|---|---|---|
| 6,515,238 | B1 |   | 2/2003 | Martens et al. |  |
| 6,965,083 | B2 | * | 11/2005 | Reiser | 177/238 |
| 7,020,577 | B2 |   | 3/2006 | Wilby |  |

FOREIGN PATENT DOCUMENTS

| DE | 0 705 715 C | 3/1941 |
|---|---|---|
| GB | 0 835 991 A | 6/1960 |

* cited by examiner

*Primary Examiner*—Randy W Gibson
(74) *Attorney, Agent, or Firm*—Standley Law Group LLP

(57) ABSTRACT

A balance (1, 101) has a weighing pan (4, 104) for receiving a load (5, 6, 25) to be weighed, and an electronic weighing module (27) which includes a measuring unit (28). The balance is equipped with an electrostatic sensor (10) which is arranged so that accumulated electrostatic charges which reside on the load can be detected as the load is placed or about to be placed on the weighing pan. The balance is operated by using the electrostatic sensor to detect electrostatic charges, transferring information on a value characterizing the magnitude of the detected electrostatic charges to the measuring unit, comparing the value against a threshold value, and triggering an action of the electronic weighing module based on the comparison.

29 Claims, 5 Drawing Sheets

BALANCE WITH AN ELECTROSTATIC CHARGE BUILD-UP SENSOR

CROSS-REFERENCE TO RELATED APPLICATIONS

This application claims a right of priority under 35 USC 119 from European patent application 06 10 0970.0, filed 27 Jan. 2006, the content of which is incorporated by reference as if fully recited herein.

TECHNICAL FIELD

The invention relates to a method of operating a balance, and also to a balance that is operable to carry out the method.

BACKGROUND OF THE ART

In the precise measurement of the weight of items, it is a requirement to minimize as far as possible all factors that have an influence on the weighing result. To name examples, air movements can in most cases be reduced by a draft protection device to such an extent that they become negligible, or fluctuations of the ambient conditions such as temperature or humidity can be eliminated for example by placing the balance in a climate-controlled room.

As a further factor which likewise has an influence on the weighing result, electrostatic charges which are present in the weighing compartment or in the environment or directly on the load to be weighed manifest themselves in particular when weighing electrically non-conductive samples or when weighing samples in containers consisting of a non-conductive material. The influence of electrostatic charges becomes a problem in particular when large polymer- or glass containers are used in a situation where the purpose of a weighing process is to determine small mass differentials. The weighing pan itself on which the samples and/or containers, i.e. the weighing loads, are placed is in most cases not accumulating an electrostatic charge because as a rule the pan is made of metal, and the charges can drain away through a conductive connection to the balance housing.

An accumulation of electrostatic charges on a load resting on the weighing pan causes a difference between the respective electrostatic potentials of the load and the grounded parts of the balance. Because of this difference in potential, there is a force acting between the load and, e.g., the floor of the weighing compartment. The vertical component of this force is therefore also acting on the weighing cell, in addition to the force generated by the load. This causes an error in the weighing result that is delivered and displayed, which is undesirable in particular in balances of high resolution.

Other parts of the balance such as for example a draft protection device, if there is one, or other parts of the housing to the extent that they consist of a non-conductive material, can likewise accumulate an electrostatic charge and cause errors in the weighing result through a so-called parasite force pattern.

An analytical balance for weighing electrostatically charged objects is described in U.S. Pat. No. 6,515,238 B1. The balance, which is equipped with a draft protection device, has a device for generating an ionized air stream, which includes an ionization device with at least two point electrodes, each of which carries a voltage of opposite polarity relative to its respective counterpart electrode, and which also includes a fan. The device can be activated by the closing of the access openings of the draft protection device and deactivated after a predetermined running time.

The device just described has the disadvantage that on the one hand the fan can produce undesirable air currents and on the other hand there is always a given fixed amount of ionization charges available for neutralizing the electrostatic charges, independent of the magnitude of the electrostatic charge accumulated by the load on the weighing pan.

An unmet advantage of the prior art is to provide a method and a device which make it possible to operate a balance in particular in the presence of electrostatic charges in accordance with the requirements of the user.

SUMMARY OF THE INVENTION

This objective is met by a method with the features of the independent methods claim and by a balance with the features of the independent apparatus claims.

A balance with a weighing pan serving to receive a load to be weighed and with an electronic weighing module which includes a measuring unit, is equipped with an electrostatic sensor arranged so that electrostatic charges can be detected which reside on a load that is placed or about to be placed on the weighing pan. A method of operating the balance includes the following method steps:

detecting the presence of electrostatic charges by means of the electrostatic sensor, transferring the information concerning the value characterizing the magnitude of the charges to the measuring unit, comparing the value characterizing the magnitude of the charges against a threshold value that can have been defined beforehand, and triggering an action of the electronic weighing module.

The method offers the advantage to a user of the balance that it can provide information regarding the presence of electrostatic charges as a factor that has an influence on the weighing result, thereby making it possible to prevent that a weighing is carried out which could lead to a wrong weighing result. This is particularly important if the magnitude of the electrostatic charges exceeds a threshold value that can have been previously defined. The user of the balance is given an opportunity to remove the problem of electrostatic charges in order to arrive at a correct weighing result.

It is useful not to set the threshold value in advance as a constant, but to make the threshold value variably selectable depending on the weighing task through appropriate measures, be it by using special electronic components or by using a program which recalls at least one previously defined threshold value that has been stored in a memory unit. The latter solution requires a processor unit and a memory unit in the measuring unit.

Preferably in the case just mentioned, a program is executed in the processor unit which compares the amount of the detected charges with at least one threshold value that is stored in the memory unit and can be predefined in a variable amount. The detected amount of the charges can in this case by stored in the memory unit for further processing.

An electrostatic sensor allows in particular, if electrostatic charges are present, to measure their magnitude and/or polarity and to transfer the information concerning the measurement value characterizing the magnitude and polarity to the measuring unit. The program compares the measurement value with at least one threshold value which can be predefined in a variable amount in the memory unit, triggers an action of the electronic weighing module when the at least one threshold value is exceeded, and stores the measurement value in the memory unit for further processing.

Accordingly, it is possible to make a qualitative, semi-quantitative or quantitative analysis of a possible accumulation of electrostatic charges that occurs in the process of weighing on the weighing load or in some cases on certain parts of the balance. A qualitative analysis includes determining the presence of electrostatic charges above a predefined threshold value. A semi-quantitative analysis requires at least two predefined threshold values to be provided, where the analysis of the detected charge accumulation consists of comparing the value characterizing the amount of the charge accumulation to the different threshold values and to categorize the amount, for example as no accumulation, low accumulation, medium accumulation, high accumulation. Subsequently, the program triggers an action commensurate with the assigned category. In a quantitative analysis the accumulation of electrostatic charges is measured, and a measurement value indicating the magnitude and/or polarity is processed in such a way according to a routine of the program that is executable in the processor that an action which is appropriate in view of the measured value can be performed in the electronic weighing module.

The electronic weighing module in a preferred embodiment includes a reference clock to provide time data to the processor unit, and the program assigns a specific time value to each value or measurement value characterizing the quantity, in particular the height and/or polarity of the charge accumulation and stores the value pair in the memory unit.

The balance includes an output unit, in particular a display- and operating unit and/or at least one light-emitting diode, in some cases a printer, wherein a signal that depends on the value and/or measurement value which characterizes the charge accumulation, in particular its height and/or polarity, is delivered at the output unit and is thus made known to the user of the balance. The user can in particular be prompted to trigger an action of the electronic weighing module. However, it is in many cases advantageous if the action of the electronic weighing module is controlled by the program on the basis of the measurement value, and that the action occurs automatically.

In an advantageous further developed embodiment, the balance has an ionization device which is activated when a predefined threshold value has been exceeded by the value and/or measurement value which characterizes the charge accumulation, in particular its height and/or polarity.

It is also conceivable and desirable to store the data regarding the duration and intensity of the activity of the ionization device in the memory unit, from where the data can be recalled at any time by way of an output unit of the balance.

The activity of the ionization device, in particular the duration and/or the intensity of the ionization can in this case be commensurate with the magnitude of the value characterizing the charge accumulation, in particular the measurement value.

In a further developed version of the method, after the ionization has occurred, the magnitude, in particular the height and/or polarity of the charge accumulation, are redetermined and the value, in particular the measurement value, is transferred to the measuring unit, whereupon the duration and/or intensity of the ionization is adapted to the new value and the cycle of steps of determining the magnitude of the charge accumulation and subsequently performing an ionization is repeated until the value characterizing the charge accumulation has fallen below a predefined threshold value.

There can also be a humidity sensor for determining the atmospheric humidity, and the information regarding the value characterizing the air humidity can be sent to the measuring unit, wherein the program modifies the activity of the ionization device in accordance with the amount of atmospheric humidity.

In a special design version of the balance, where the latter has a weighing compartment that surrounds the weighing pan and is enclosed by a draft protection device, and wherein the draft protection device has at least one access opening to the weighing compartment which can be closed by a wall panel, the method includes as a further advantageous step that when the wall panel is moved, the electrostatic sensor detects electrostatic charges on the load already at the time when the load is brought into the weighing compartment.

In the case where a code reader is provided and the container holding the weighing materials carries a code which identifies the material that the container is made of, a program segment can be included in the program to modify the activity of the ionization device in accordance with the container material.

A balance that is operable to perform the method according to the foregoing description has a weighing pan as well as an electronic weighing module, wherein the latter includes a measuring unit. There is an electrostatic sensor which is arranged so that electrostatic charge accumulations can be detected on a load that is placed or about to be placed on the weighing pan. The electrostatic sensor is connected to the measuring unit, so that an action of the electronic weighing module can be triggered when a charge accumulation has been found that exceeds at least one predefined threshold value.

A balance of this kind offers more assurance to a user, who does not need to be constantly mindful of weighing errors caused by a possible electrostatic charge accumulation of the load, as the measures that are thereby triggered will contribute to solving this problem.

With preference, a measuring unit of the balance is equipped with a processor as well as a memory unit, wherein the processor is operable to execute a program which, if a charge accumulation in excess of at least one predefined threshold value has been detected, triggers an action of the electronic weighing module and/or stores the measured value in the memory unit for further processing.

In a particular embodiment, the balance has an ionization device which can be activated in case electrostatic charges are present and which can be controlled by the measuring unit in accordance with the charge accumulation that has been found on the load.

The balance according to a preferred embodiment has a weighing compartment surrounding the weighing pan, which is enclosed by a draft protection device. The draft protection device has at least on wall panel which can close an access opening to the weighing compartment, wherein at least one sensor element of the at least one electrostatic sensor is arranged in the immediate proximity of the closable opening. Preferably, the at least one ion source of the ionization device and/or at least one sensor element of the at least one electrostatic sensor can be arranged in the immediate proximity of the at least one opening of the draft protection device.

In a preferred embodiment, the draft protection device of the balance has at least one stationary wall which has recesses. Arranged in the latter are the at least one ion source of the ionization device and/or at least one sensor element of the at least one electrostatic sensor.

The balance includes in particular a balance housing which serves to accommodate a weighing cell and the electronic weighing module, wherein one wall of the balance housing represents a stationary wall of the draft protection device and wherein channels are arranged on the balance housing which end in the recesses and in which connecting leads to the sensor element of the electrostatic sensor and/or to the ion source of the ionization device are arranged. As an alternative, the channels can be of a more spacious configuration so that electronic components of the electrostatic sensor and/or of the ionization device can be accommodated in them.

A preferred further developed embodiment of the balance includes at least one light-emitting diode and/or an indicating unit and/or a printer for a semi-quantitative indication of an electrostatic charge accumulation and/or to deliver a measurement value characterizing the height and/or the polarity of the charge.

BRIEF DESCRIPTION OF THE DRAWINGS

The balance according to the invention as well as the method of determining the presence of electrostatic charges in the weighing compartment of a balance will hereinafter be illustrated and described through the drawings which are of a simplified, schematic nature and wherein.

DETAILED DESCRIPTION OF A PREFERRED EMBODIMENT

Figure 1:
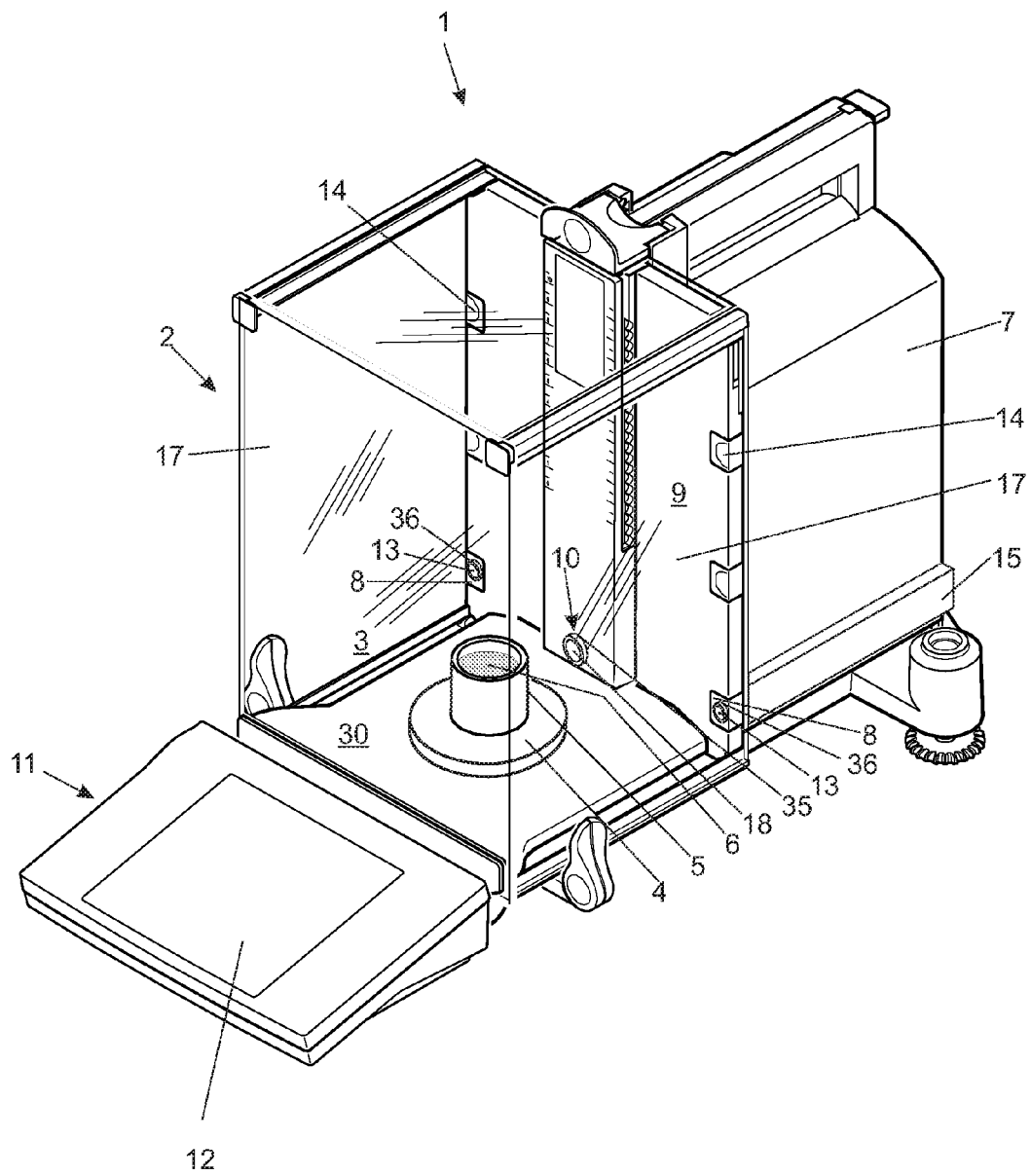
FIG. 1 shows a balance with a draft protection device in a three-dimensional representation, with a sensor element of an electrostatic sensor and with two ion sources of an ionization device.

FIG. 1 shows a balance 1 in a three-dimensional representation. The balance 1 has a draft protection device 2 which encloses a weighing compartment 3 in which a weighing pan 4 is located. The weighing pan 4 is connected in a conventional manner to a weighing cell, which is located inside the housing 7 of the balance 1 and therefore hidden from sight, by means of a rod (likewise invisible here) which passes through the weighing compartment floor 30. A container 5 containing a substance 6 that is to be weighed is resting on the weighing pan 4. The container 5 is made of a polymer material, for example polyethylene or polypropylene, and the substance 6 can for example be a quantity of powder which needs to be weighed before being used in a laboratory. Because of the electrically insulating properties of the container 5 as well as the weighing substance 6, both can collect an electrostatic charge and will as a result exert an electrostatic force which is added to the force that their mass exerts on the weighing pan 4. This introduces an error in the weighing result.

As a means for determining the extent or magnitude of the charge accumulated by the container 5 with the weighing substance 6 on the weighing pan 4, an electrostatic sensor 10 is arranged near the weighing pan 4 on the rear wall 9. The part of the electrostatic sensor 10 that is visible in FIG. 1 is essentially the sensor element 18 in a mounting frame 35. This electrostatic sensor, which will be described in more detail below in the context of FIG. 5, detects electrostatic charges in the weighing compartment 3 which in the illustrated example accumulate with preference on the load consisting of the container 5 and weighing substance 6 which is present on the weighing pan 4. The signal corresponding to the electrostatic charge accumulation is sent by the sensor 10 to the electronic weighing module which is enclosed in the balance housing 7 and therefore likewise invisible in FIG. 7, where the signal as a function of the distance between the load 5, 6 and the electrostatic sensor 10 is processed by the processor of a measuring unit and appropriate measures are put in motion.

The balance 1 has an indicating- and operating unit 11 which in the representation of FIG. 1 includes a display screen 12, preferably a touch screen display. The amount of the charge that was determined by the electrostatic sensor 10 can be displayed on the screen 12.

A qualitative indication for the presence of electrostatic charges in the weighing compartment 3 can be realized through a symbol on the screen 12. However, the magnitude of the charge accumulation, e.g. of the load on the weighing pan 4, can also be represented through a semi-quantitative indication, for example by the symbolic use of colors on the display screen, where white indicates the presence of a low charge and red indicates a high charge, while at least one intermediate level could be symbolized by the color yellow or orange. Of course, a quantitative indication on the display screen 12 of the measured amount of the charge is likewise conceivable. However, it is advantageous in the latter case to use the distance between the electrostatic sensor 10 and the container 5 as an additional quantity that needs to be determined and which enters into the calculation of the amount of the charge. The polarity of the charges can likewise be detected by the electrostatic sensor 10 and represented in the indication.

Two ion sources of an ionizing device, each identified by the reference symbol 13, are arranged in recesses 8 on the right and left side, respectively, in the rear wall 9 of the balance. Each ion source 13 is likewise held in a mounting frame 36. If an electrostatic charge has been detected, the ionizing device is put into operation, i.e. activated, prior to the weighing process, so that the latter can take place without errors due to the parasitic action of electrostatic forces.

The ion sources 13 of the ionization device are accommodated preferably in laterally arranged recesses 8 of the rear wall 9. These recesses which, when not in use, are closed by means of a clip-on cover 14, provide access to the weighing compartment from the outside even if all of the walls 17 of the draft protection device 2 are closed. The recesses 8 are easily accessible from the outside, because balance housing 7 is narrower across its width than the rear wall 9. Arranged on the outside of the balance housing 7 are conduit channels 15 which contain the connecting leads (not visible here) between the ion source 13 and the associated electronic circuit.

Figure 2:
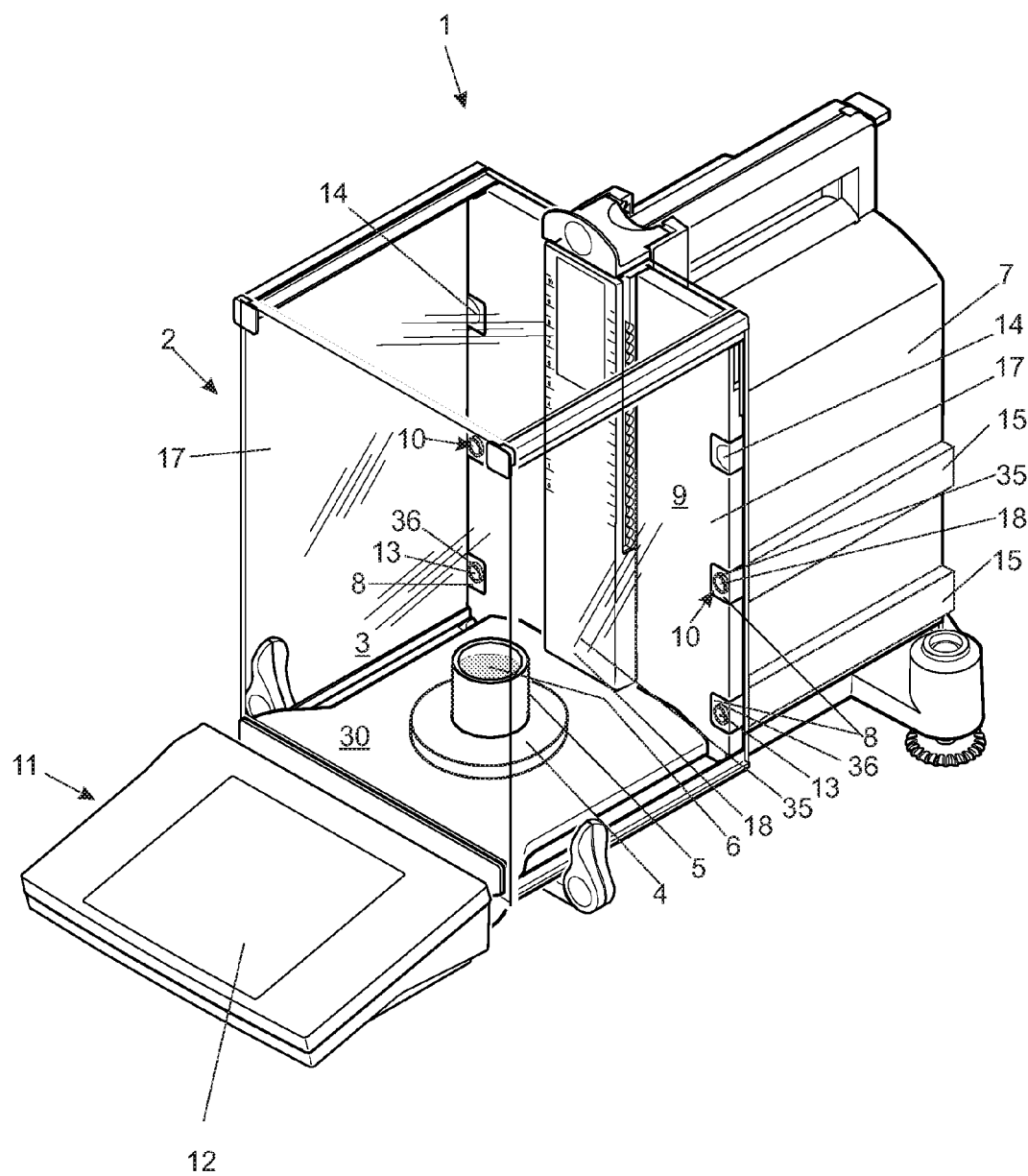
FIG. 2 shows a balance with a draft protection device in a three-dimensional representation, with two sensor elements of at least one electrostatic sensor and with two ion sources of an ionization device.

FIG. 2 shows the balance in a form of representation that is analogous to FIG. 1, wherein two sensor elements 18 of at least one electrostatic sensor 10 are arranged in recesses 8 on the right and left side of the rear wall 9 of the balance 1. The ion sources 13 of the ionization device are arranged like those of FIG. 1 in further recesses 8. Arranged on the outside of the balance housing 7 are conduit channels 15 which contain the connecting leads (not visible here) which connect the electrostatic sensor 10 and the ion source 13 to the associated electronic circuit. The two sensor elements 18 of the at least one electrostatic sensor 10 which are located in the recesses 8 are thus able to detect the presence of electrostatic charges on the weighing load already when the latter is brought into the weighing compartment 3 through an open side wall 17, whereupon the ionization device can be activated immediately.

Figure 3:
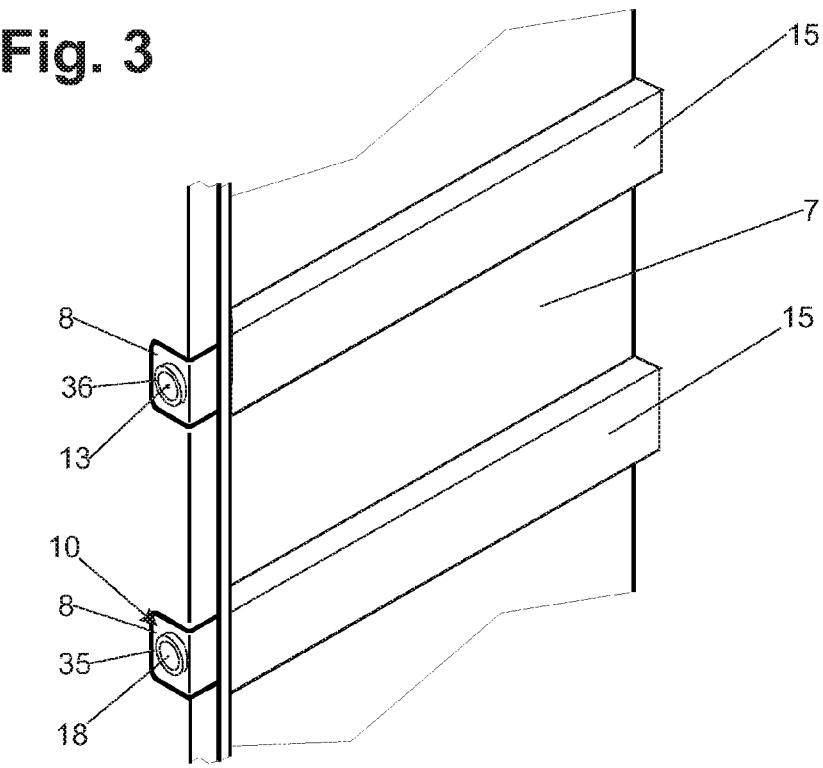
FIG. 3 shows a variation of the arrangement of the sensor elements and ion sources of FIG. 2 in an enlarged detail drawing.
Figure 4:
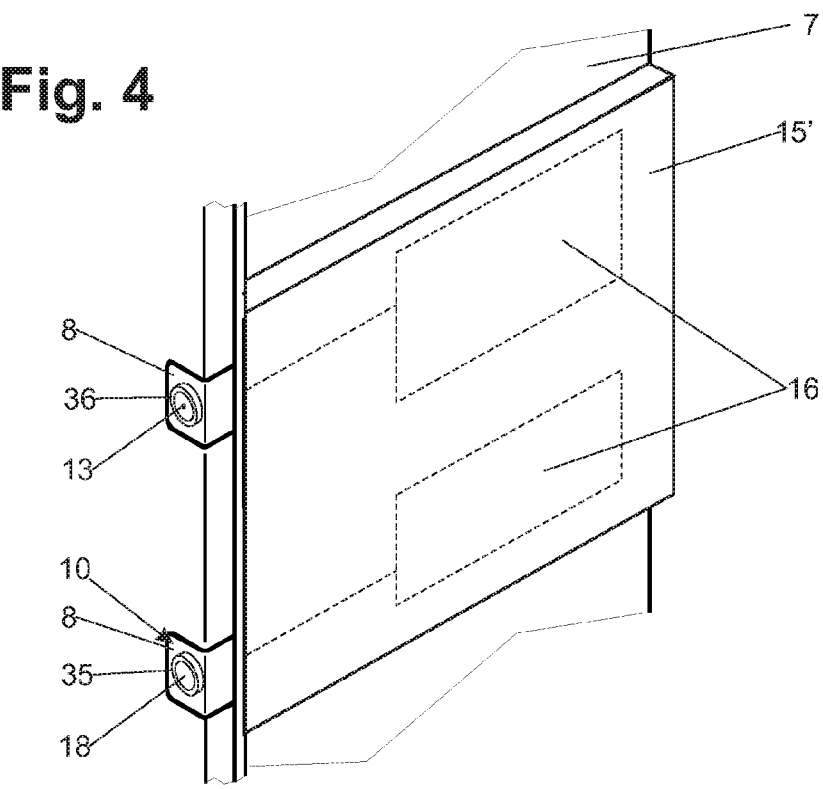
FIG. 4 shows a further variation of the arrangement of the sensor elements and ion sources of FIG. 2 in an enlarged detail drawing.

FIGS. 3 and 4 are enlarged detail illustrations of the balance of FIG. 2, showing a wall of the balance housing 7 on which conduit channels 15, 15' of different configurations are arranged. While a conduit channel 15 (according to FIG. 3) is suitable only to carry the connecting leads, a conduit channel 15' (according to FIG. 4) can also contain electronic components 16, for example those that serve to control the ion source 13 as a part of the ionization device and/or the electronic measuring circuit of the electrostatic sensor 10. It should be noted that the ion source 13 and the sensor element 18 in the representation of FIGS. 3 and 4 are switched in relation to the representation of FIG. 2. This illustrates how the ion source 13 and the sensor element 18 can be placed in different positions within the weighing compartment 3. It is preferred, for example, if a sensor element 18 is positioned in immediate proximity to the weighing pan 4, but without mechanical contact to the latter. There can be one, two or more sensor element 18 and/or electrostatic sensors 10. An ion source 13 of the ionization device is preferably arranged close to the sidewall panel 17 which is slidable for opening and closing the weighing compartment 3. In this case, two, there can be more than one, preferably two ion sources 13.

As the ion sources 13 are preferably located close to their respective sidewalls 17 of the draft protection device 2, as can be seen in FIGS. 1 to 4, it is advantageous if they are activated as soon as a sidewall 17 is opened, so that the container 5 as well as the weighing substance 6 are freed of electrostatic charges as soon as they are brought into the weighing compartment 3.

Figure 5:
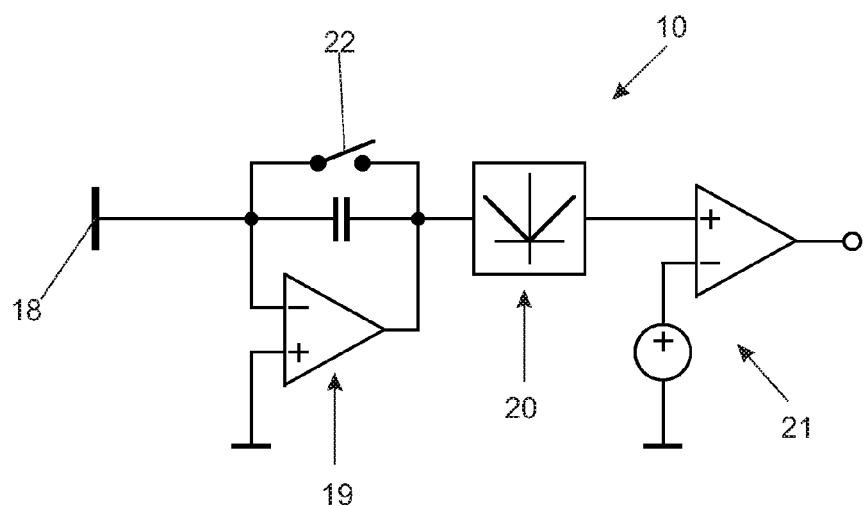
FIG. 5 is a circuit schematic of an example of an electrostatic sensor.

FIG. 5 shows the circuit schematic of an electrostatic sensor 10. The latter is based on the principle of detecting induced charges and has a sensor element 18 in the form of a surface electrode. The measuring signal is processed through an integrator stage 19, a bipolar/unipolar converter stage 20 and a comparator stage 21 to bring it into a displayable format. The integrator stage is paralleled by a switching element 22 which serves to reset the measuring signal manually or automatically after a measurement or an action by the electronic weighing module has been completed. In the comparator stage 21, the integrated absolute value of the measuring signal is compared to at least one threshold value. Next, an indication can be presented either on the display screen 12 of the indicating- and operating unit 11 or by means of a light-emitting diode to alert the user that the load, for example the container 5 and/or the weighing substance 6, carries an electrostatic charge in excess of a given threshold value. In addition, an action can be triggered, preferably under the control of the electronic weighing module. An action of this kind involves for example activating an ionization device which over a predefined time period delivers electrical charges into the weighing compartment 3 to neutralize the accumulation of electrostatic charges.

As self-evident, the comparator stage 21 does not have to be limited to a single comparator unit. Rather, the comparator stage 21 which is shown schematically in FIG. 4 stands as a representative example for a comparator stage with one comparator unit or with a plurality of comparator units with different given threshold values, for example three threshold values, so that the electrostatic charge can be evaluated in a semi-quantitative way. The output of the ionizing device is adapted in its intensity and/or duration depending on which of the three threshold values have been exceeded. If the detection includes the polarity of the charge, the polarity of the ions to be produced by the ionizing device can also be given.

Further actions of the balance 1 can be performed as an alternative or in addition to activating the ionizing device. For example, when an electrostatic charge in excess of one of the higher threshold values is detected, a warning signal can be given out and/or any further weighing can be blocked.

Of course, it is also possible to use other principle for the detection of electrostatic charges. The principle of the electric field mill, in particular, should be mentioned in the present context.

Figure 6:
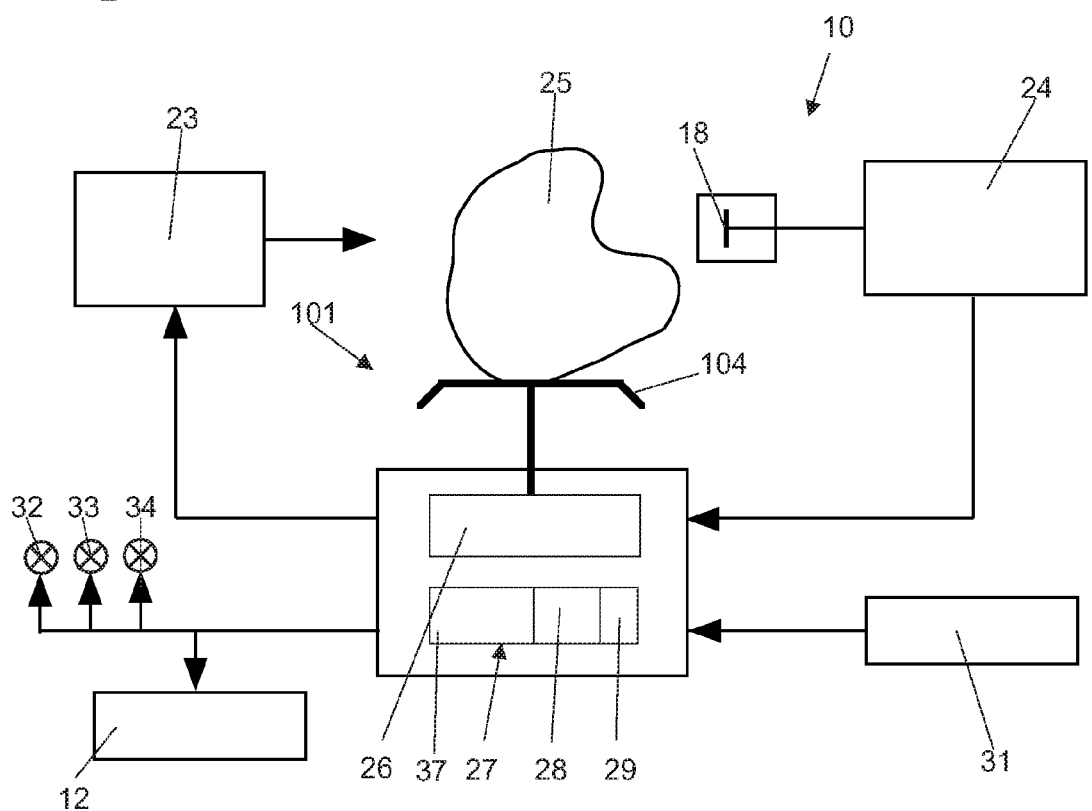
FIG. 6 shows a block diagram of a balance with an electrostatic sensor and with an ionization device.

In a strongly simplified schematic representation, FIG. 6 shows the block diagram of a balance 101 with an electrostatic sensor 10 of the kind shown, e.g. ion FIG. 5, and with an ionizing device 23. The balance 101 which in this case does not have a draft protection device is equipped with a weighing pan 104 which carries the load, shown here as an arbitrary weighing object 25 without a container. The balance 101 further has a weighing cell 26 and an electronic weighing module 27. The electrostatic sensor 10 has a sensor electrode as a sensor element 18 and a an electronic sensor circuit 24, which includes the integrator stage 19, the bipolar/unipolar converter stage 20, and the comparator stage 21 shown in FIG. 5, but which can also have another design configuration in accordance with a known principle. The electronic sensor module 24, as well as the ionizing device 23, is connected to the electronic weighing module 27 of the balance 101. Thus, the data regarding the magnitude of the electrostatic charge can be delivered to a measuring unit 28 of the electronic weighing module. The data are stored in a memory unit 29 in the measuring unit 28. In a processor unit 37 of the measuring unit 28 a program is executed which, in the event that threshold values are exceeded, activates the ionization device. Therefore, the ionization device 23 is likewise connected to the electronic weighing module 27. The threshold values can be modified by way of an entry device 31, for example the indicating and operating unit 11. An output that characterizes the magnitude of the electrostatic charge accumulation can occur either on the display screen 12 of the indicating and operating unit 11 or by means of optical indicator elements, e.g. the light-emitting diodes 32, 33, 34 which signal with different colors when a given threshold value has been exceeded.

Figure 7:
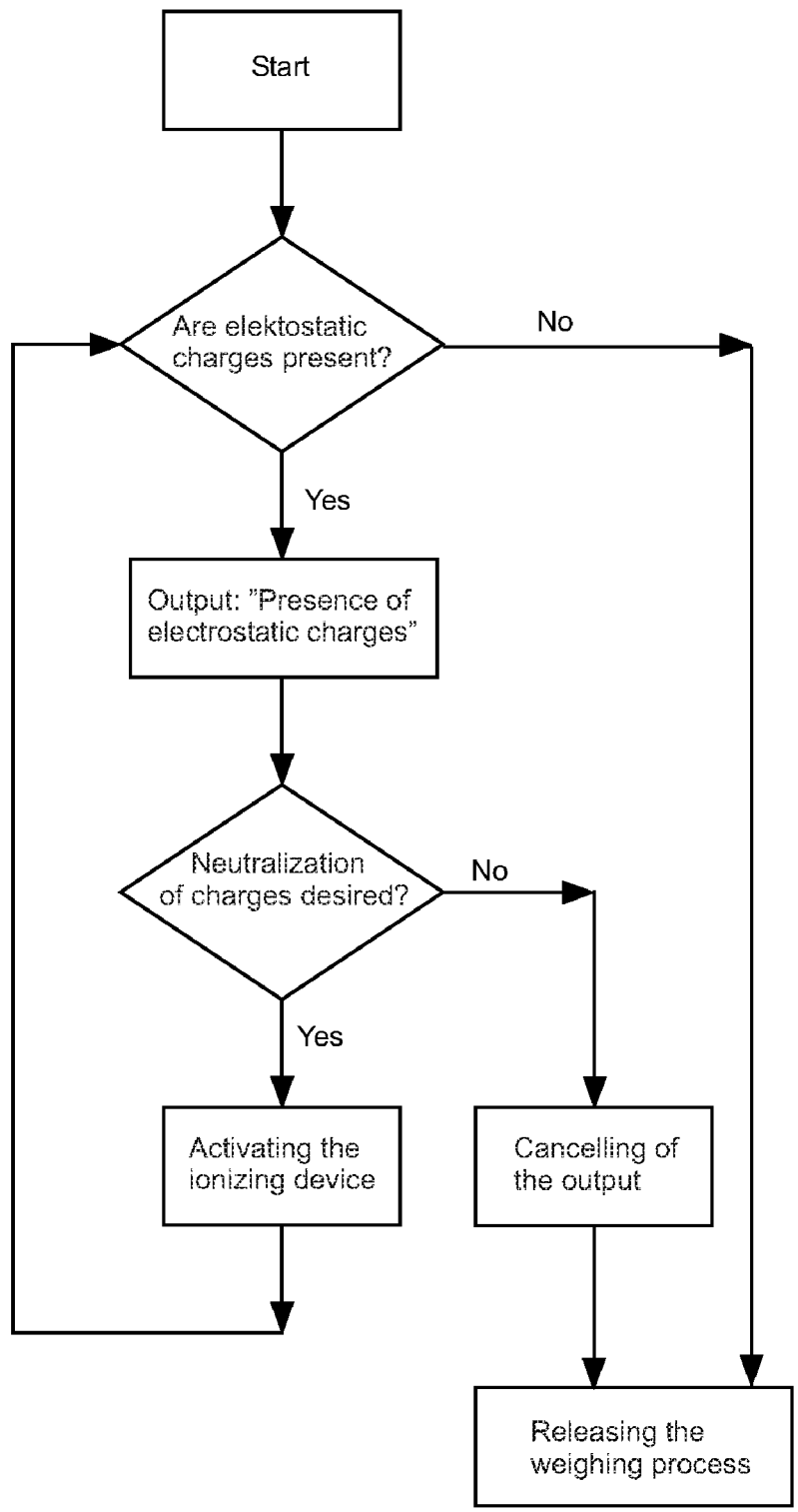
FIG. 7 shows a flowchart diagram to illustrate how the electrostatic sensor and the ionization device work together.

FIG. 7 illustrates in flowchart format a method of operating the balance 1, 101 with regard to the detection and the removal of electrostatic charges in the vicinity of the weighing pan 4, 104 and/or of the load. The presence of the charge accumulation can be detected by means of the electrostatic sensor 10, and the amount and/or the polarity of the charge is determined by means of a comparator stage which can in principle also be a comparator unit that forms part of the measuring unit. The result is indicated and a determination is made whether or not an action is required by the balance 1, 101, i.e. whether the ionizing device 23 needs to be activated, and in particular what intensity level and, if applicable, what polarity is required in the ionization to be produced in the air that surrounds the weighing pan 4, 104 and/or the weighing load. If there is a need to neutralize the electrostatic charge accumulation, the ionizing device 23 is activated. In case that this is not necessary, the indication is canceled and the weighing process can be started. After the ionization has taken place, whose intensity and duration are adapted to the detected magnitude of the electrostatic charge accumulation, the weighing process is likewise started and the indication is canceled.

If after an ionization has taken place, the magnitude of the charge accumulation is still found to be above a threshold value, the duration and/or intensity of the ionization is again adapted to this new magnitude or measurement value, and the cycle of detecting the magnitude of the charge and performing an ionization is repeated until said magnitude or measurement value has fallen below a predefined threshold value.

While the invention has been presented and described through the embodiments that are illustrated in the drawings, it is self-evident that embodiments of the method and of the device other than those described herein can be consistent with the spirit of the invention. In particular, one could use an analog circuit to realize the function of triggering an action in the electronic weighing module after the presence of electrostatic charges has been detected.

What is claimed is:

1. A method for weighing a load, comprising the steps of:
providing a balance comprising a weighing pan to receive the load, an electronic weighing module with a measuring unit, and an electrostatic sensor arranged to detect an accumulated electrostatic charge on the load when it is placed or about to be placed on the weighing pan;
detecting the electrostatic charge using the electrostatic sensor;
comparing the detected electrostatic charge against a threshold value;
generating a signal that characterizes the detected electrostatic charge;
transferring the generated signal to the measuring unit; and
triggering an action of the electronic weighing module.

2. The method of claim 1, wherein:
the measuring unit comprises a processor unit and a memory unit, the threshold value being stored in the memory unit; and
the comparing step comprises executing a program in the processor unit that compares the detected electrostatic charge against the threshold value.

3. The method of claim 2, further comprising the step of:
storing a value of the generated signal in the memory unit for further processing.

4. The method of claim 3, further comprising the steps of:
measuring, with the electrostatic sensor, the amount and/or polarity of any electrostatic charge detected in the detecting step;
directing the information concerning a measurement value characterizing the amount and/or polarity of the electrostatic charge to the measuring unit;
executing the program to compare the measurement value against the threshold value stored in the memory unit; and
if the threshold value is exceeded,
triggering an action of the electronic weighing module; and
storing the measurement value in the memory unit for further processing.

5. The method of claim 4, wherein:
the electronic weighing module comprises a reference clock accessible to the processor unit; and
the method further comprises the steps of:
associating a time value with the measurement value to form a value pair; and
storing the value pair in the memory unit.

6. The method of claim 5, wherein:
the balance comprises an output unit; and
the triggering step comprises delivering a signal to the output unit, the signal being dependent on the measurement value.

7. The method of claim 6, wherein:
the triggering step further comprises the step of giving out a warning signal from the output unit to alert the user of the balance of electrostatic charge accumulations by means of the output unit and to prompt the user to trigger an action of the electronic weighing module.

8. The method of claim 6, wherein:
the triggering step is controlled by means of the program, based on the measurement value.

9. The method of claim 8, wherein:
the balance comprises an ionizing device; and
the triggering step comprises the step of:
activating the ionizing device when the detected electrostatic charge exceeds the threshold value.

10. The method of claim 9, wherein:
at least one of the duration and the intensity of the ionization during the activating step is determined by the magnitude of the detected electroststic charge.

11. The method of claim 9, wherein the method further comprises the steps of:
redetermining the magnitude and/or polarity of the accumulated electrostatic charge after the step of activating the ionizing device;
transferring a redetermined measurement value to the measuring unit;
adapting the duration and/or intensity of the ionization to the redetermined measurement value;
activating the ionizing device according to the redetermined measurement value; and
repeating these steps until the redetermined measurement value has fallen below the threshold value.

12. The method of claim 9, wherein:
the balance comprises a humidity sensor; and
the activating step further comprise the steps of:
measuring the atmospheric humidity with the humidity sensor;
transferring information on the magnitude of the measured atmospheric humidity to the measuring unit; and
modifying the activity of the ionization device based upon the measured atmospheric humidity.

13. The method of claim 12, wherein:
the balance comprises a weighing compartment surrounding the weighing pan, the weighing compartment being enclosed by a draft protection device with at least one access opening to the weighing compartment which can be closed by a wall panel; and
the detecting step is triggered when the wall panel is moved.

14. The method of claim 9, wherein:
the balance comprises a code reader adapted for reading a code on a container that holds the load; and
the method further comprises the steps of:
reading the code to obtain information concerning the material of the container; and
executing a program routine to modify the activity of the ionization device in accordance with the container material.

15. A balance, comprising:
a weighing pan;
an electronic weighing module comprising a measuring unit; and
an electrostatic sensor, arranged to detect an electrostatic charge accumulated on a load which is placed or about to be placed on the weighing pan, the electrostatic sensor being connected to the measuring unit;
wherein the electronic weighing module is adapted to act when the electrostatic charge detected exceeds a threshold value.

16. The balance of claim 15, wherein:
the measuring unit further comprises a processor unit and a memory unit; and
the processor unit is operable to execute a program that triggers an action of the electronic weighing module when the detected electrostatic charge accumulation exceeds the threshold value and/or stores a value of the detected electrostatic charge in the memory unit for further processing.

17. The balance of claim 15, further comprising:
an ionization device adapted for at least one of: activation by the user and control by the measuring unit, either of which is in accordance with the detected electrostatic charge.

18. The balance of claim 17, further comprising:
a weighing compartment that surrounding the weighing pan; and
a draft protection device enclosing the weighing compartment, the draft protection device providing an access opening to the weighing compartment which can be closed by a wall panel;
wherein a sensor element of the electrostatic sensor is immediately proximate to the access opening.

19. The balance of claim 18, wherein:
the ionization device comprises a ion source that is immediately proximate to the access opening.

20. The balance of claim 19, wherein:
the draft protection device further comprises a fixed wall with recesses, at least one of the ion source and the one sensor element being arranged in the recesses.

21. The balance of claim 20, further comprising:
a balance housing that accommodates a weighing cell and the electronic weighing module, a wall of the balance housing forming the fixed wall; wherein conduit channels that terminate in the recesses are arranged on the balance housing, such that leads connected to at least one of the sensor element and the ion source are arranged in the conduit channels.

22. The balance of claim 20, further comprising:
a balance housing that accommodates a weighing cell and the electronic weighing module; a wall of the balance housing forming the fixed wall; wherein conduit channels that terminate in the recesses are arranged on the balance housing, with electronic components of at least one of the electrostatic sensor and of the ionization device being accommodated inside the conduit channels.

23. The balance of claim 15, further comprising:
an output instrument, adapted to provide at least one of:
a semi-quantitative indication of a value characterizing a magnitude of the detected electrostatic charge and a measurement value characterizing at least one of the amount and the polarity of the electrostatic charge accumulation.

24. The method of claim 1, wherein:
the balance comprises an ionizing device; and
the triggering step comprises the step of:
activating the ionizing device when the detected electrostatic charge exceeds the threshold value.

25. The method of claim 24, wherein:
at least one of the duration and the intensity of the ionization during the activating step is determined by the magnitude of the detected electroststic charge.

26. The balance of claim 15, further comprising:
a weighing compartment that surrounding the weighing pan; and
a draft protection device enclosing the weighing compartment, the draft protection device providing an access opening to the weighing compartment which can be closed by a wall panel;
wherein a sensor element of the electrostatic sensor is immediately proximate to the access opening.

27. The balance of claim 23, wherein:
the output device is a light-emitting diode.

28. The balance of claim 23, wherein:
the output device is an indicating unit.

29. The balance of claim 23, wherein:
the output device is a printer.

* * * * *